United States Patent
Skvorecz

(10) Patent No.: US 6,955,327 B1
(45) Date of Patent: Oct. 18, 2005

(54) COLLAPSIBLE WIRE CHAFING STAND

(76) Inventor: Robert Skvorecz, 90 George St., Paterson, NJ (US) 07503

( * ) Notice: Subject to any disclaimer, the term of this patent is extended or adjusted under 35 U.S.C. 154(b) by 0 days.

(21) Appl. No.: 10/813,780

(22) Filed: Mar. 31, 2004

(51) Int. Cl.[7] ............................................ A47G 23/02
(52) U.S. Cl. ...................... 248/153; 126/40; 211/181.1; 248/175; 248/188.6
(58) Field of Search ................................ 248/153, 175, 248/151, 176.2, 188.6, 166, 439; 126/40, 126/33, 50; 99/449, 339, 426; 206/502, 509; 211/181.1

(56) References Cited

U.S. PATENT DOCUMENTS

| | | | | |
|---|---|---|---|---|
| 4,135,691 A | * | 1/1979 | Wiesmann ................ | 248/188.6 |
| 4,557,200 A | * | 12/1985 | Geschwender .............. | 108/132 |
| 5,287,800 A | * | 2/1994 | Orednick ...................... | 99/449 |
| 5,301,909 A | * | 4/1994 | Chang ......................... | 248/146 |
| 6,047,932 A | * | 4/2000 | Skvorecz .................... | 248/153 |
| 6,170,405 B1 | * | 1/2001 | Weitzman et al. ............ | 108/25 |
| 6,520,354 B1 | * | 2/2003 | Skvorecz .................. | 211/181.1 |

* cited by examiner

Primary Examiner—Ramon O Ramirez
(74) Attorney, Agent, or Firm—Anderson Kill & Olick, PC

(57) ABSTRACT

A wire chafing stand including a rim of wire steel in a substantially rectangular configuration, lateral sides and a longitudinal axis extending from the lateral sides and a pair of wire legs pivotally connected to the rim for permitting the wire legs to fold relative to the frame in order to adjust the chafing stand into a closed position with the chafing stand forming a narrow lateral profile for transportation or storage or with the chafing stand folded into an open position for heating preheated foods in a chafing dish. Each of the wire legs is pivotally connected to the rim through a hinge pin assembly permitting each pair of wire legs to pivot outwardly in opposite directions with each leg establishing a fixed position at an inclined angle of less than 90 degrees relative to the rim when the wire chafing stand is folded into an open position such that the legs will stand firmly on any level surface and the chafing stand will not unintentionally collapse.

6 Claims, 3 Drawing Sheets

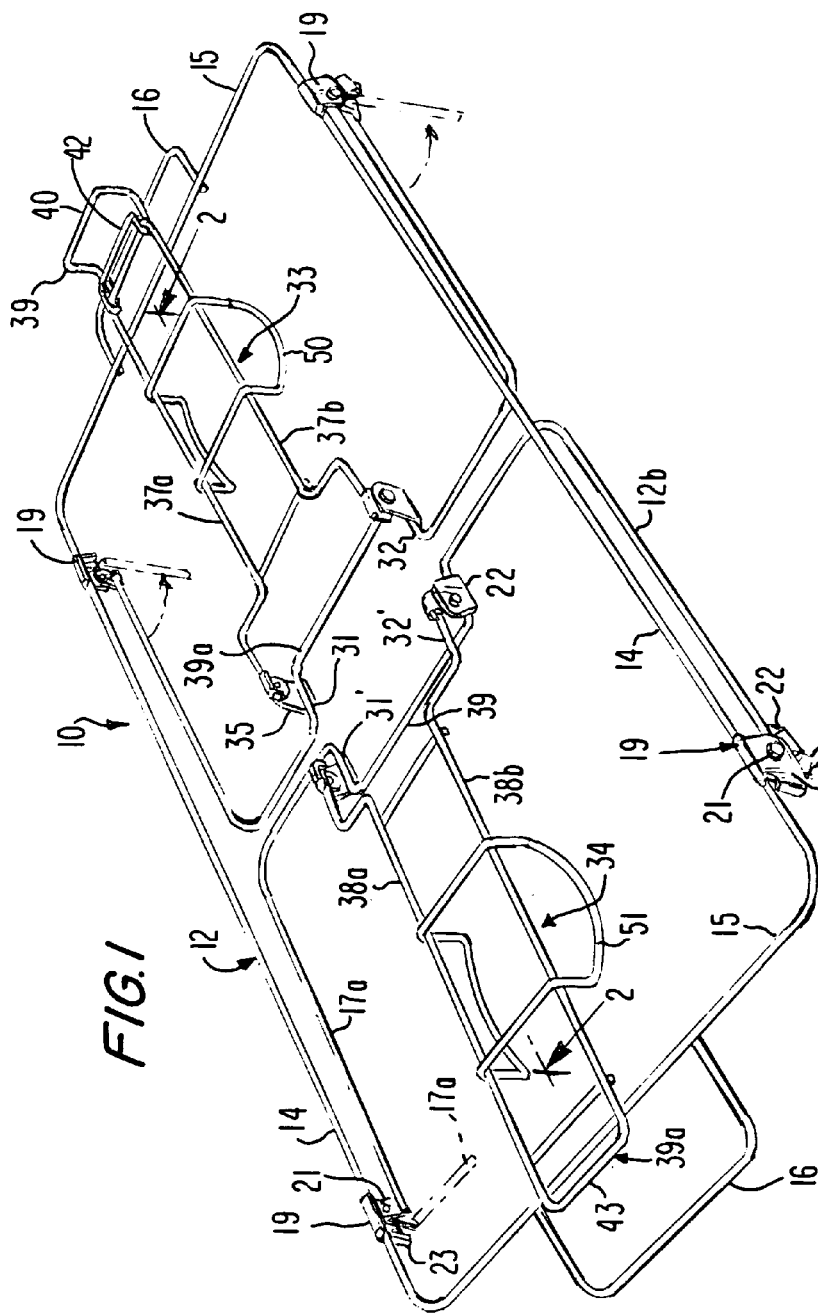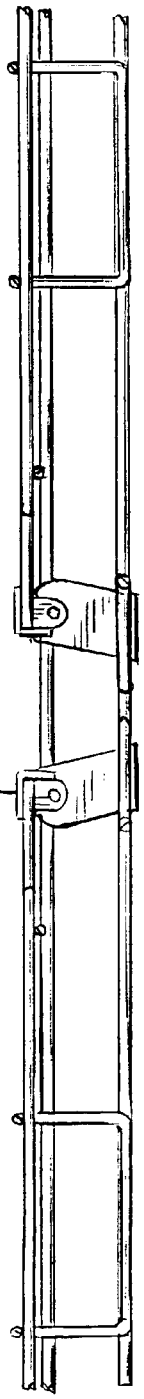

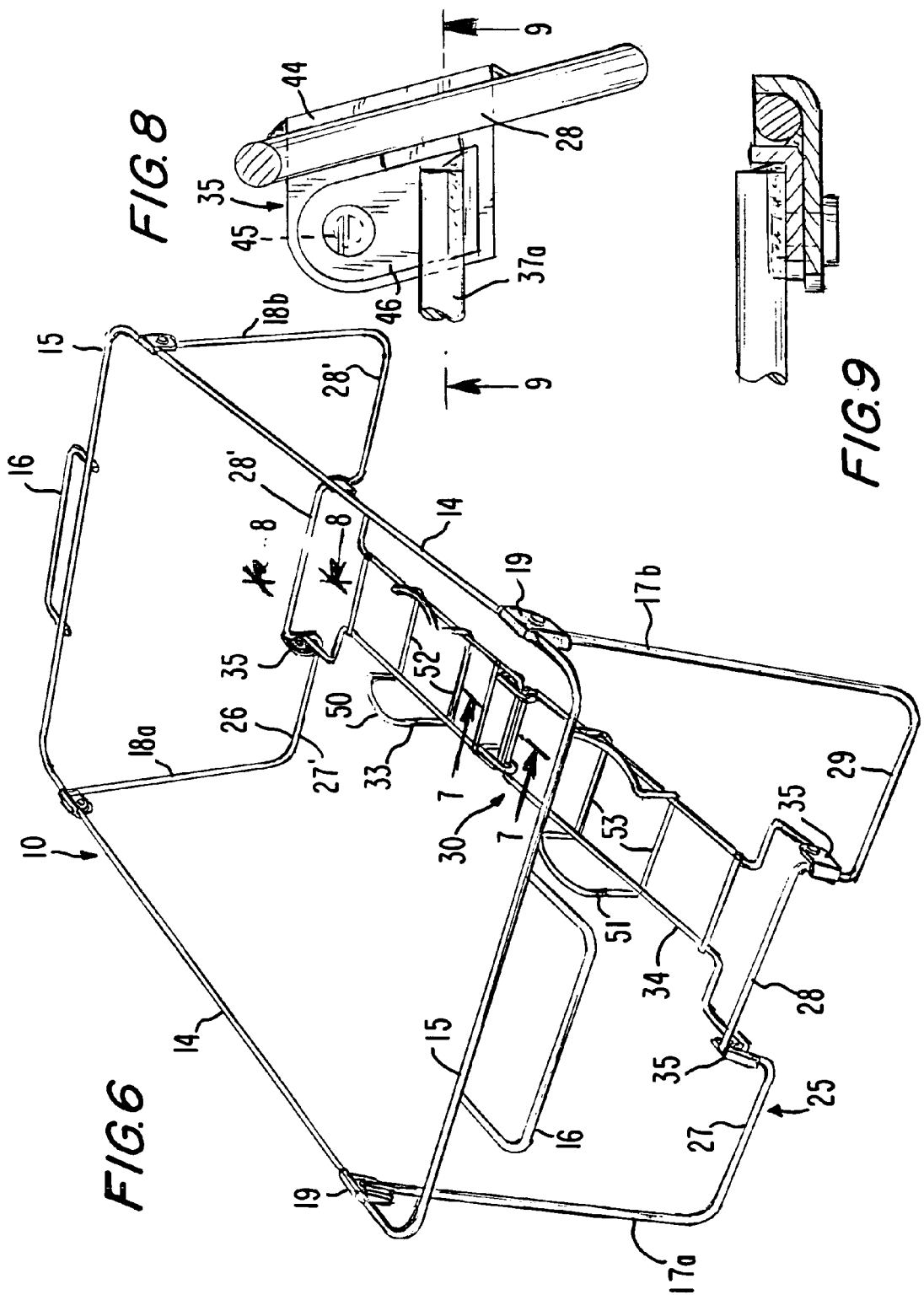

COLLAPSIBLE WIRE CHAFING STAND

FIELD OF INVENTION

This invention relates to a collapsible wire chafing stand which can be readily folded up for purposes of transportation or compact storage.

BACKGROUND OF THE INVENTION

A wire chafing stand is a device used for maintaining and heating pre-cooked food at a location remote from the kitchen in which the food was originally prepared and cooked. The chafing stand is generally designed as an open structure preferably of wire rod steel to support aluminum pans into which a chafing dish can be placed. The chafing stand must also support a plurality of auxiliary fuel heaters which are used to heat the chafing dish.

Although the chafing stand has little weight its physical dimensions occupy substantial volume which makes it prohibitively expensive to ship on an individual basis. In fact, the cost of transportation from the point of manufacture to the distributor and/or to the retailer is a critical economic factor in the pricing of the wire chafing stand.

Currently, when long distances are involved, it is conventional to nest together a multiplicity of chafing stands for shipment in a stacked arrangement and then to separate the nested stands at the point of destination. An example of a commercially available chafing stand designed to permit multiple nesting is described by applicant in U.S. Pat. No. 5,921,513 the disclosure of which is herein incorporated by reference. This chafing stand includes an upper and lower rim interconnected by wire legs which extend below the lower rim to form the base of the stand and a plurality of offsets designed for displacing the legs to permit multiple nesting. The upper and lower rims in combination provide the structural support for the stand. The lower rim is also designed to include a plurality of holders for chafing fuel heaters. An alternative design of applicant which permits multiple chafing stands to be nested together is described in U.S. Pat. No. 6,520,354 the disclosure of which is herein also incorporated by reference. In this alternative arrangement one wire rim is used to form the frame of the stand in combination with two supporting legs, two handles and a plurality of offsets.

A wire chafing stand which folds up to minimize volume for purposes of transportation has been suggested in the prior art as taught in U.S. Pat. No. 6,234,068. However, in this design when the wire chafing stand is folded open the wire legs stand upright. This design is believed to be inherently unstable and is not user friendly in that it can easily fall over.

SUMMARY OF THE INVENTION

The wire chafing stand of the present invention is preferably constructed using one wire rim to form the frame of the chafing stand and a pair of support legs to support the frame. The support legs are adjustably connected to the frame so that the legs may be manually adjusted into a folded open position or into a folded up, i.e. closed position relative to the wire rim. When in the folded open position the legs lie inclined relative to the frame so that the chafing stand is stable and will stand firmly on any level surface. Moreover, the wire legs pivot using a hinge pin assembly which is designed so that the chafing stand cannot unintentionally collapse when in the open position. When the chafing stand is folded into the closed position the wire legs are aligned in a plane substantially parallel to the wire rim to form a narrow lateral profile for purposes of transportation and/or storage. In this closed position the chafing stand occupies very little volume which reduces the cost of transportation.

In the preferred embodiment of the invention the wire chafing stand comprises a wire rim configured in any desired geometry having lateral sides and a longitudinal axis extending from said lateral sides and a pair of wire legs pivotally connected to the rim for permitting the wire legs to fold relative to the frame so that the chafing stand can be folded into a closed position having a narrow lateral profile or into an open position for supporting the stand on a level surface and having a hinge pin assembly for each of the wire legs comprising stop means in an arrangement such that each pair of wire legs will pivot outwardly in opposite directions when the wire chafing stand is folded into an open position with each leg establishing a fixed position at an inclined angle of less than 90 degrees relative to the rim thereby permitting the legs to stand firmly on any level surface and preventing the chafing stand from unintentionally collapsing.

The wire chafing stand of the present invention has increased stability when in the folded open position which minimizes any tendency of the stand to fall over or collapse. In addition, the wire chafing stand of the present invention further comprises a fuel heater connector assembly for supporting a plurality of chafing fuel heaters. The fuel heater connector assembly bridges the pair of wire legs in the open position and accommodates a plurality of fuel heaters.

BRIEF DESCRIPTION OF THE DRAWINGS

Other advantages of the present invention will become apparent from the following detailed description of the invention when read in conjunction with the accompanying drawings of which:

FIG. 1 is an isometric view of the preferred embodiment of the chafing stand of the present invention with the legs shown in the manually folded up position;

FIG. 2 is a sectional view taken along the lines 2—2 of FIG. 1;

FIG. 6 is another isometric view of the preferred embodiment of the chafing stand of the present invention of FIG. 1 with the legs shown in the manually folded open position;

FIG. 8 is a sectional view through the raised segment at one end of a detachable section of the fuel heater connector assembly taken along the lines 8—8 in FIG. 6; and FIG. 9 is sectional view taken along the lines 9—9 in FIG. 8.

DETAILED DESCRIPTION OF THE INVENTION

Figure 4:
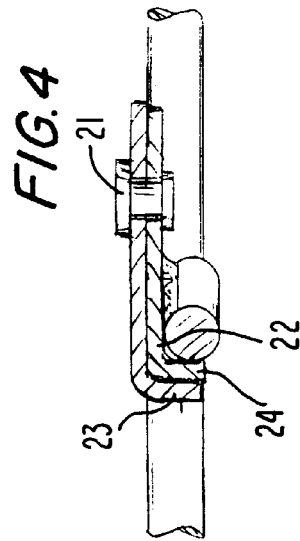
FIG. 4 is a cross sectional view of a hinge pin assembly permitting the legs to fold relative to the frame taken along the lines 4—4 of FIG. 3.
Figure 5:
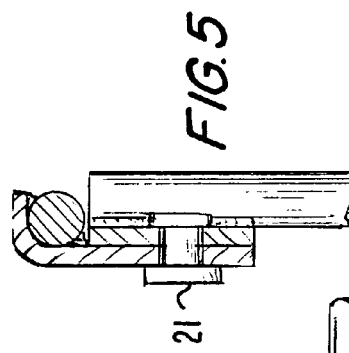
FIG. 5 is an end view through the hinge pin assembly of FIG. 3 taken along the lines 5—5.
Figure 7:
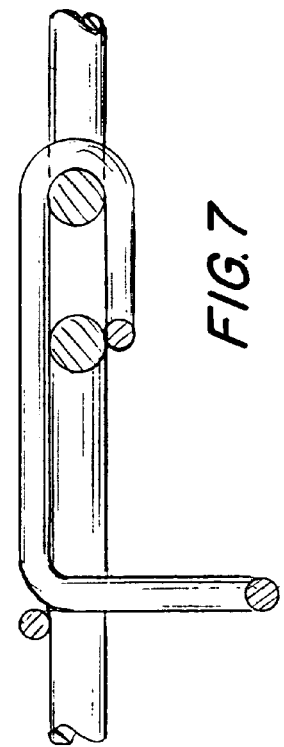
FIG. 7 is a cross sectional view of one of the detachable sections of the fuel heater connector assembly of FIG. 1 taken along the lines 7—7 in FIG. 6.
Figure 3:
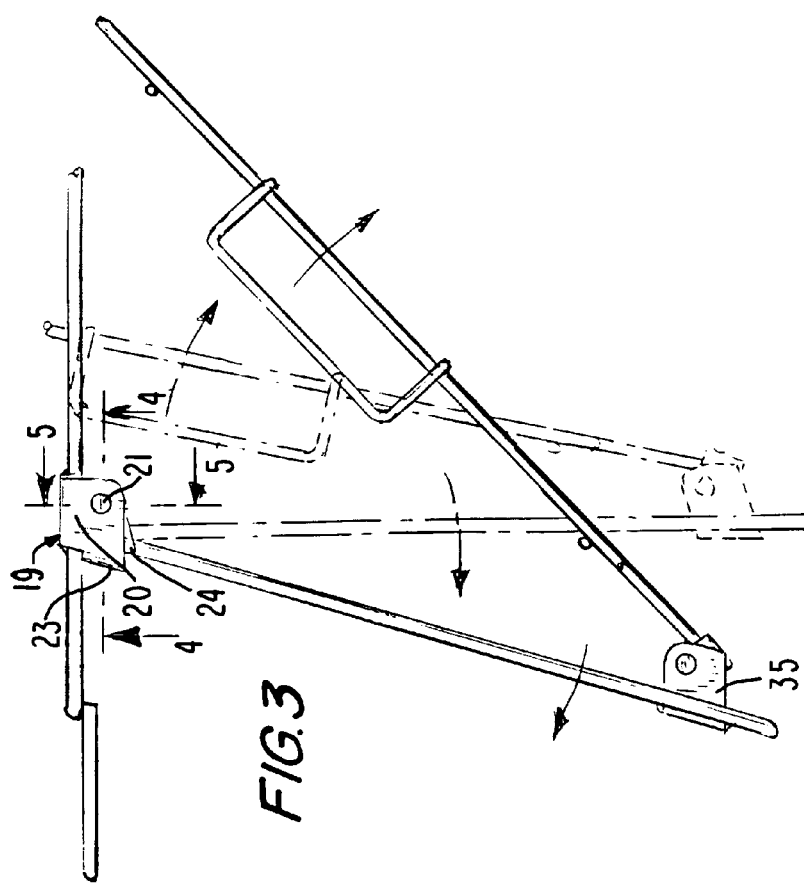
FIG. 3 is a partial side view of the chafing stand of FIG. 1 illustrating movement of one of the wire legs for folding the stand into an open or closed position.

Referring now in detail to the preferred embodiment of the chafing stand 10 of the present invention as shown in FIGS. 1–9 thereof. The chafing stand 10 includes a wire rim 12 forming a frame of generally rectangular geometry with rounded edges. The wire rim 12 has two opposite longitudinal sides 14, 14, two opposite lateral sides 15, 15, a pair of handles 16,16 which are either welded or integrally formed on the opposite lateral sides 15,15 of the wire rim 12 and a pair of wire legs 17a,17b, and 18a,18b which are pivotally connected to the rim 12, preferably to the longitudinal sides 14, 14 thereof, permitting the wire legs 17a, 17b,18a,18b to fold relative to the frame. Each pair of wire legs 17a,17b and 18a,18b may be manually folded to adjust the chafing stand into a closed position as shown in FIG. 1 forming a narrow lateral profile in which position the chafing stand 10 may be readily packaged, transported and/or stored. Alternatively, each pair of wire legs 17a,17b and 18a,18b may be folded into a normally folded open position as shown in FIG. 6 for heating preheated foods in a chafing dish when placed on the chafing stand 10. The rim 12 is preferably formed of a single continuous wire preferably in one operation with the handles 16, 16 extending from its lateral sides.

Each of the wire legs 17a,17b,18a,18b are connected to the rim 12 by means of a hinge pin assembly 19. Each hinge pin assembly 19 includes a bracket 20 welded to one longitudinal side 14 of the rim 12 with each bracket 20 having an opening into which a hinge pin 21 is rotatably fitted. The hinge pin 21 extends from a bracket 22 with each bracket 22 welded to each of the wire legs 17a,17b, 18a,18b respectively. Each bracket 20 has a flat planar section 23 which lies at a desired inclined angle relative to the wire rim 12 and functions as a stop for a complementary flat planar surface 24 on each bracket 22 so that each pair of wire legs 17a,17b, and 18a,18b will pivot outwardly in opposite directions and come to rest when the flat surface 24 in bracket 22 comes into contact with the flat surface 23 in bracket 20 thereby affixing the wire chafing stand in an open position as shown in FIG. 6 and preventing the wire legs from pivoting any further. In the open position each pair of wire legs 17a,17b, and 18a,18b lie at an inclined angle relative to the rim 12 of less than 90 degrees and preferably between about 60° and 85°, optimally 70° with the hinge pin assemblies 19 locked in the fully open position to prevent the chafing stand from collapsing. Each pair of legs 17a,17b, and 18a,18b unfold outwardly in opposite directions relative to each other so that the legs will stand firmly on any level surface and the chafing stand will not unintentionally collapse.

Each of the two pair of wire legs 17a,17b, and 18a,18b are formed from single continuous wire such that the wire legs 17a,17b of one pair form a single bottom section 25 interconnecting the wire legs 17a,17b and the wire legs 18a,18b of the other pair form a single bottom section 26 interconnecting the wire legs 18a,18b respectively. Each bottom section 25 and 26 includes three segments 27, 28 and 29 and 27', 28' and 29' respectively with the intermediate segments 28,28' being raised relative to the outer segments 27,29 and 27',29' respectively. The outer segments 27,29 and 27',29' are straight segments in alignment with one another for forming a straight level bottom 27,29 and a straight level bottom 27'29' respectively. The straight segments 27,29 and 27',29' support the chafing stand 10 when placed on any level surface. The intermediate segments 28,28' which are raised above the outer segments 27,29 and 27',29' form arms 31,32 and 31'32'0 respectively. A fuel heater connector assembly 30 is attached to each bottom sections 25 26 on opposite sides thereof. The fuel heater connector assembly 30 includes two detachable sections 33 and 34 each of substantially equal length with each detachable section 33 and 34 being pivotally connected by means of a hinge pin assembly 35 to each one of the arms 31,32 and 31',32' in each of the raised segments 28, 28'. Each detachable section 33 and 34 has parallel wire rods 37a, 37b and 38a,38b and end sections 39 and 39a respectively. The end section 39 of the detachable section 33 has an overhanging member 40 adapted to fit over the end section 39b of the detachable section 34 when the chafing stand 10 is folded into an open position and in addition the end section 39 includes a wire lip 42 which forms a groove into which a wire tongue 43 of detachable section 34 fits for interlocking the two detachable sections 33 and 34 together. The sections 33 and 34 readily detach from one another by slipping or pulling out the wire tongue 43 from the groove of detachable section 33 and lifting the detachable section 33 relative to the detachable section 34 and pivoting the detachable sections 33 and 34 so that they fold backwards while folding up each pair of wire legs into the closed position with each end section 39 and 39a of each of the detachable sections 33 and 34 positioned adjacent to one of the handles 16 as is shown in FIGS. 1 and 2.

Each hinge pin assembly 35 includes a flat plate 44 welded to the raised section 28 having a hole into which is fitted a hinge pin 45 extending from a bracket 46 which is welded to each of the wire rods 37a,37b and 38a,38b on each opposite side of each of the detachable sections 33 and 34. The hinge pin assembly 35 permits the detachable sections 33 and 34 to pivot upon rotation of the hinge pin 45 relative to the bottom section 35 of the wire legs 17a,17b, 18a,18b when folding the chafing stand into either the open or closed position.

The parallel wire rods 37a, 37b and 38a,38b in each of the detachable sections 33 and 34 of the fuel heater connector assembly 29 supports wire holders 50 and 51 which are in a configuration forming two depressed sections 52 and 53 into which two separate chafing fuel heaters (not shown) may be mounted.

What I claim is:

1. A wire chafing stand comprising a frame formed of steel wire rod represented by a wire rim configured in any desired geometry having longitudinal and lateral sides and a longitudinal axis extending from said lateral sides and a pair of wire legs pivotally connected to the rim for permitting the wire legs to fold relative to the frame so that the chafing stand can be folded into a closed position having a narrow lateral profile or into an open position for supporting the stand on a level surface and having a hinge pin assembly for each of the wire legs comprising stop means in an arrangement such that each pair of wire legs will pivot outwardly in opposite directions when the wire chafing stand is folded into an open position with each leg establishing a fixed position at an inclined angle of less than 90 degrees relative to the rim thereby permitting the legs to stand firmly on any level surface and preventing the chafing stand from unintentionally collapsing wherein each of the two pair of wire legs have a common bottom section with the wire chafing stand further comprising a fuel heater connector assembly having two detachable sections with one end of each detachable section connected to a bottom section and the opposite ends being detachably connected to one another for supporting a plurality of chafing fuel heaters in the wire chafing stand open position.

2. A wire chafing stand as defined in claim 1 wherein each wire leg lies in the chafing stand open position at a fixed inclined angle of between about 60° and 85° relative to the rim.

3. A wire chafing stand as defined in claim 2 further comprising at least one hinge pin assembly for each detachable section with each hinge pin assembly pivotally connecting the detachable section at one end thereof to a bottom section to permit each detachable section to be pivoted open when folding the chafing stand to the open position and having means for detachably interlocking the opposite ends thereof when folding the chafing stand into the closed position.

4. A wire chafing stand as defined in claim 3 wherein said means for detachably interlocking the opposite ends of each detachable section comprises an end section for each detachable section with the end section of one detachable section having an overhanging member adapted to fit over the end section of the other detachable section upon folding the chafing stand into the open position and further comprising a wire tongue formed at said one end section and a groove for receiving the wire tongue formed at said other end section.

5. A wire chafing stand as defined in claim 3 wherein each detachable section of said fuel heater connector assembly comprises at least one wire rod holder including a depressed portion for supporting a chafing fuel heater.

6. A wire chafing stand as defined in claim 5 wherein the lateral sides of said rim include an integrated handle for manually holding the stand.

* * * * *